Sept. 20, 1938.　　　　J. E. MacKAY　　　　2,130,467
LONGLOAD SIGNAL
Filed Sept. 26, 1935　　　2 Sheets-Sheet 1
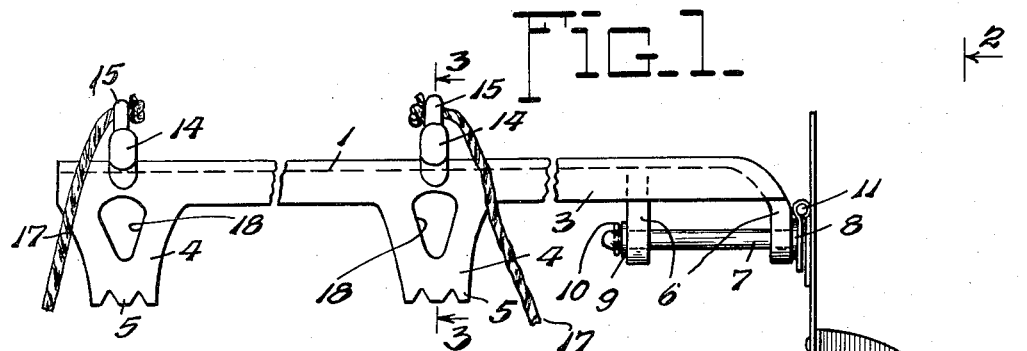
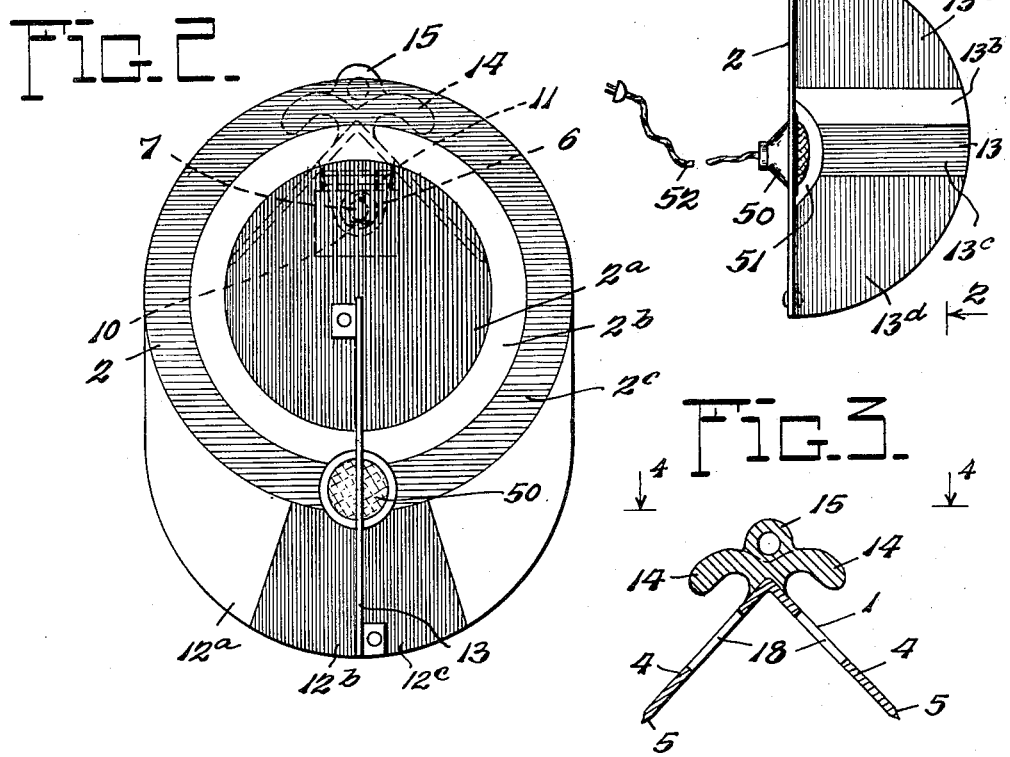
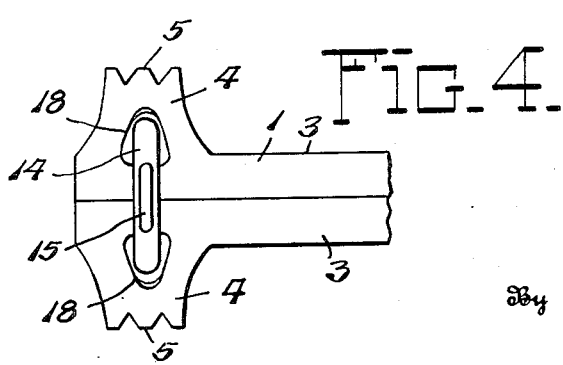
Inventor
JOHN E. MacKAY.
By Robert Cobb
Attorneys Sept. 20, 1938.　　　　J. E. MacKAY　　　　2,130,467
LONGLOAD SIGNAL
Filed Sept. 26, 1935　　　2 Sheets-Sheet 2
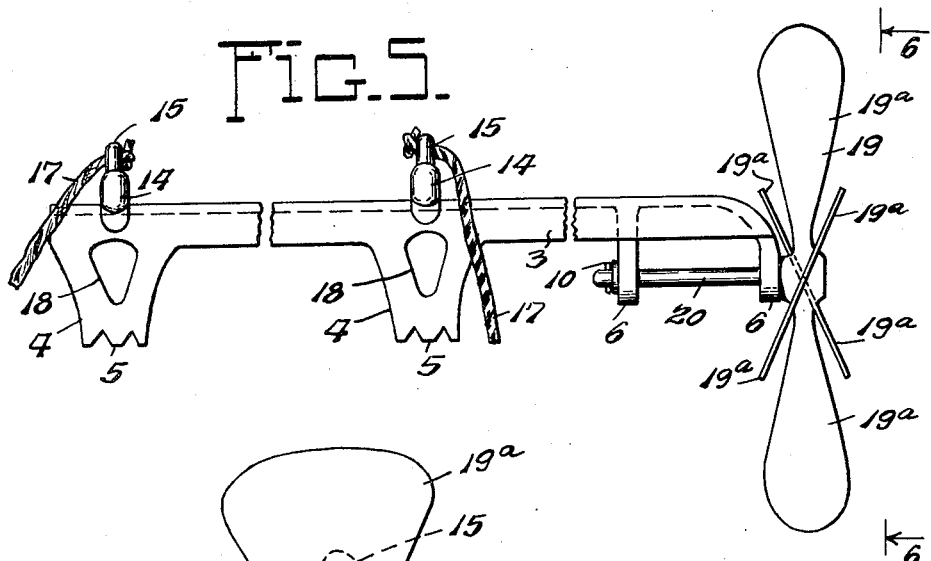
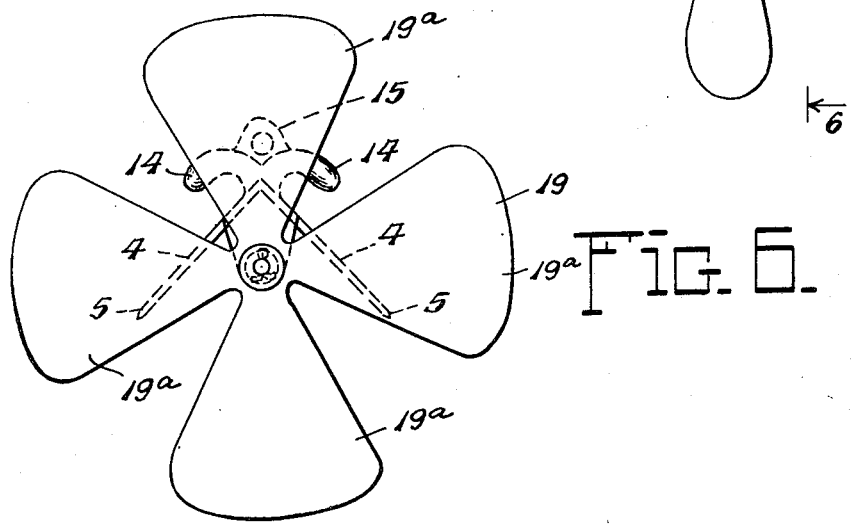
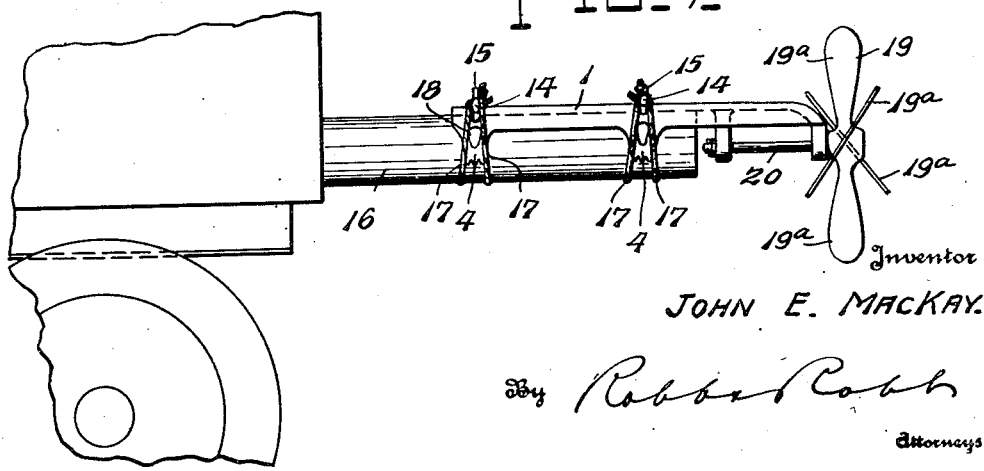
Inventor
JOHN E. MACKAY.
By Robert Cobb
Attorneys Patented Sept. 20, 1938

2,130,467

UNITED STATES PATENT OFFICE 2,130,467

LONGLOAD SIGNAL

John E. MacKay, Cleveland, Ohio

Application September 26, 1935, Serial No. 42,314

7 Claims. (Cl. 40—128)

The purpose of this invention is to provide a simple, compact, and efficient form or forms of semaphore or signal devices capable of being used in connection with long loads hauled by automotive vehicles, trucks, or the like, which operate on the highways or traffic lanes of cities, or in the country. Municipal and State regulations in most places require that where the load being conveyed by a vehicle projects a greater or less distance from the rear or front ends of the carrier there shall be provided some kind of signal extended rearwardly and forwardly of the vehicle as a warning for those traveling either on foot or in vehicles and either following the load carrier or coming from the opposite direction and meeting the load carrier, or moving in paths transversely thereto.

As a general thing the signal means which is most commonly employed consists of a red piece of cloth, rag, or the like, tied to a pole which projects rearwardly from the vehicle in which the load is being hauled.

In the carrying out of my invention it has been my aim to provide a simple, compact, and efficient construction or constructions of a signal device in which the supporting means employed may be very readily and quickly attached to a portion of the load or a part projecting rearwardly or forwardly from the vehicle.

Another object of the device has been to supply means of the class above noted wherein the signalling or semaphore member is mounted in such a way as to permit of movement thereof, said member being intended to be colored in attractive striking colors so that the attention of those intended to be warned by the signal will be readily drawn thereto, thus increasing the efficiency of the device for its particular purpose.

Still another object of the invention is the provision whereby the attaching or supporting means for the signalling member and the signalling member itself may be readily assembled in the manufacture of the device, and when so assembled will be connected in a substantial manner so that the device will have relatively long life under practical conditions of use, which are somewhat severe in respect to means of the class referred to.

A further object in view in the construction of my device has been to avail of parts which are so readily assembled and attached together that the construction is simple and one which might be readily standardized and compelled to be adopted by the regulations of States and municipalities for effective warning purposes, for which it is designed.

In the accompanying drawings I have illustrated two forms or modifications of my construction of device for the purpose hereinbefore described, and in the said drawings:

Figure 1 is a side elevation of a preferred form of my invention, wherein the signalling or semaphore member may be characterized as being of the pendulum type, the same having a rotative or swivelling connection with the supporting means therefor.

Figure 2 is a rear elevation of the device of Figure 1, dotted lines bringing out more fully the formation of the support for the signalling member, the view being taken looking in the direction of line 2—2 of Figure 1.

Figure 3 is a sectional view through the support above referred to, the view taken about on the line 3—3 of Figure 1.

Figure 4 is a fragmentary top plan view of a portion of the support, bringing out more clearly the form of the combined cleat and loop member for one of the attaching ropes or tie members.

Figure 5 illustrates a modification of the invention wherein the semaphore or signalling member is of a rotating type as distinguished from the oscillating or pendulous type of Figures 1 and 2.

Figure 6 is a view looking toward the modified form of device in Figure 5, in the direction of the arrows 6—6 of Figure 5.

Figure 7 is a view showing how the invention may be readily attached to a piece of pipe or similar object that extends rearwardly or forwardly from the payload body of a vehicle, the rear portion of which is roughly illustrated in this figure.

Describing the constructions of my invention illustrated in the drawings, in detail, I shall refer first to Figures 1 to 4 inclusive wherein the pendulum type of signal or semaphore member is employed. It may be stated that my device consists of two main parts, namely, a support 1 and a signalling or semaphore member 2. The support 1 may be made of a malleable casting, pressed metal, or the like, and may be said to be of somewhat V-form in cross section, such form being established by the side portions 3 that extend about at right angles to each other. The side parts 3 aforesaid are equipped with downwardly extending engaging arms or feet 4, the purpose of which will be more fully stated hereinafter. It suffices to say that the lower extremities of the parts 4 are preferably formed with teeth or biting elements 5.

Near one end of the support 1 said support is equipped with depending bearing members or arms 6, in the bearings of which is mounted the pendulum member 7 which may take a form somewhat like a headed pin or bolt, the head of which is designated 8, and the inner portion of which opposite head may be fastened to the inner bearing member 6 by means of a washer 9 and cotter-pin 10. I do not wish to be restricted to the specific form of the member 7, for it is obvious that this may be in the form of an ordinary bolt and nut so far as its general construction is concerned.

The pintle member 7 is designed to support the signalling or semaphore member 2, previously mentioned, for which purpose I provide, intermediate the member 2 and the head 8 of the pintle member 7, a hinge structure, the hinge portion of which is designated 11, one side of the hinge being welded to the member 2 or otherwise secured thereto and the other side of the hinge being similarly attached to the head 8 of the member 7.

The semaphore member 2 may take different forms, but, generally speaking, I prefer to use a downwardly elongated plate structure which is colored with rather vivid colors that may be enameled thereon, or applied thereto in any desired way conducive to cheapness and attention attracting results. In the present form of my device now described, the member 2 is provided with a round area 2a red in color, a white circular stripe 2b, a blue surrounding circular stripe 2c, and below the area of the blue stripe 2c there may be provided colored areas 12a in white, 12b in red, and 12c in white. All of the foregoing colored areas are readily to be seen from the rear of the signalling device. However, since it is quite desirable that attention be directed to the device when it is viewed from the side or angles between points directly in rear and directly at the sides of the invention, I propose to equip the member 2 with a rearwardly extending vane 13, and this vane is intended to be painted or otherwise colored with differently colored areas 13a, 13b, 13c, 13d.

Reverting to the support 1, it is noted that this support is equipped at its rear end and intermediate portion with attachment members in the form of a cleat member 14 and an associated attachment loop 15. The parts 14 and 15 may be cast or formed integrally with the support 1, this being easily done when the support is in the form of a casting, and the manner of use of the parts 14 and 15 is as follows: A piece of rope or cable will be formed at one end with a knot, after which the rope is threaded or passed through one of the loops 15 until the knot engages the loop. The rope or tie member may be six feet long, more or less, but is intended to be of sufficient length to enable it to pass around any ordinary object such as would generally be hauled in vehicles, after the manner shown in Figure 7. By disposing the support 1 upon the object, such as the pipe or bar 16 shown in Figure 7, the ropes or flexible attaching members designated 17 may be caused to readily encircle the said pipe or bar, and by easily engaging the terminal portions of the ropes with the cleats 14, the support 1 will be very firmly attached to a projecting part of the load in a self-evident manner. Where the object to which the support 1 is attached is of relatively small diameter or cross-sectional area, the ropes may be wrapped around such object several times as a convenient way of using the entire length of rope and preventing a loose end from trailing downwardly from the object.

When the object upon which the support 1 is mounted is of relatively large size, the teeth 5 of the members 4 will have a tendency to dig into the object to facilitate the more firm attachment of the support thereto.

It is noted that the said members 4 are formed with lateral openings 18 therein, and the purpose of these openings is to facilitate the attachment of the device to a small diameter rod, bar, or piece of pipe that may fit in the space between the sides 3 of the body of the support. The provision of the openings 18 will permit the ropes 17 to be passed therethrough and beneath such a bar, pipe, or rod, enabling the ropes to directly contact the latter and to firmly tighten thereagainst for facilitating their holding action according to the above mode of attachment.

Referring now to Figures 5 to 7 inclusive, the modification of my invention therein illustrated includes the same construction of support as previously described, and the reference characters in the drawings which have been heretofore applied to the parts of the support are therefore similarly applied in these figures. The difference in the modified construction as compared with the form previously set forth lies in the type of signal or semaphore member utilized. I prefer in this construction to avail of a blade-type signalling member 19, the blades of which are designated 19a, said blades being disposed somewhat after the manner of ordinary fan or propeller blades. Now the blades 19a will be quite readily visible from the rear as well as the sides of the device, and it is contemplated that these blades shall be strikingly or vividly colored with the particular view of arousing or attracting immediate attention thereto so that they will perform an adequate signalling function.

In the present instance the semaphore or signalling member 19 has a rotating or swivelling connection with the support established by the pintle member 20 which constitutes a shaft applied to the member 19 at the central axis thereof and attached thereto in any suitable way whatsoever. The function of the member 19 as to signalling is performed incident to its rotation. The faster the payload carrier to which the device is attached is speeded up, the faster the member 19 will rotate, and the converse is true in respect to the reduction in speed of the carrier. In this way, as the payload carrier traverses the road or highway, the speed of the part 19 changes in accordance with the speed of the carrier, and this enhances the attention attracting qualities of the signalling means in an obvious manner.

In reference to the construction of Figures 1 and 2, it is notable that by reason of the hinge connection 11 and the pintle connection 7 between the support 1 and member 2, and the fact that the vane 13 is disposed at one side of the axis of the member 2, the member 2 operates somewhat after the manner of a pendulum since it may freely oscillate laterally of the support 1 as the load carrier upon which the device is mounted sways while in motion. Moreover, as the load carrier starts forward and stops, a forward and rearward movement of the member 2 is adapted to be caused, thus creating an animated movement of the signal or semaphore, which is conducive to the attraction of attention of those intended to be warned thereby.

With the foregoing in mind, it will be apparent that my devices as previously set forth are exceedingly simple in construction, cheap to manufacture, and effective for their particular purposes.

The peculiar construction of the carrying frame and the mounting of the semaphore or signalling member with respect to the same permits the attachment of the signalling unit to the top, the side, or bottom of a load, and in any position which may be most effective for each particular case.

The semaphore member may also be rigidly attached to the carrying frame; however, the pendulum or rotary type of semaphore member will be more effective for the purposes as set forth herein.

It may be desirable to illuminate the semaphore member at night, and for this purpose a lamp 50 may be installed and secured to member 2, while the rearwardly extending vane 13 may be provided with a cut out portion 51 to permit the installation of the lamp 50 on the vertical center of the semaphore member 2. In this way illumination of the members 2 and 13 may be accomplished in a simple and effective manner.

The lamp 50 may be connected by means of a cord 52 in any convenient manner with the electric wiring circuit of the vehicle for supplying electric current to said lamp.

Having thus described my invention, what I claim as new and desire to secure by Letters Patent of the United States, is—

1. In a signalling device of the class described, in combination, a support comprising a body elongated in the direction of length of the projecting member to which it may be attached, combination loop and cleat members carried by said body, tie members engaged with the loop portions of said cleat and loop members and adapted to be wrapped about an object projecting from the body of a vehicle to thereby secure the support thereto, and a signalling member movably mounted upon the support adjacent to one end thereof.

2. A device as claimed in claim 1, wherein the support is made of V-shape in cross section forming sides for said support, and arms projecting from said sides and provided with openings through which the tie members may be passed for the purpose described.

3. In a signalling device of the class described, in combination, a support comprising an elongated body of relatively V-shape in cross section forming spaced sides, said sides being formed with arms equipped with openings, tie members carried by said support and adapted to be passed through said openings, and a signalling member movably mounted upon the support.

4. In a signalling device of the class described, in combination, a support comprising an elongated body of relatively V-shape in cross section forming spaced sides, said sides being formed with arms equipped with openings, tie members carried by said support and adapted to be passed through said openings, a signalling member movably mounted upon the support, the extremities of said arms being formed with teeth, and cleats carried by the support for cooperation with the tie members aforesaid.

5. In a signalling device of the class described, in combination, a support adapted to be carried by a vehicle having a long load thereon, for warning purposes, means for securing the said support in place to be carried by the vehicle, a pintle member located at one end of the support longitudinally thereof, a movable signalling member carried by said pintle member and adapted to be actuated incident to the movement of the support with the vehicle, and separate swing connections between the signalling member and pintle member whereby the signalling member may swing with the pintle member as an axis and whereby the signalling member may swing in a direction parallel with the axis of the pintle member.

6. In a signalling device of the class described, in combination, a support comprising a relatively long body, combination loop and cleat members carried by said body, tie members engaged with the loop portions of said cleat and loop members and adapted to be wrapped about an object projecting from the body of a vehicle to thereby secure the support thereto, a signalling member movably mounted upon the support adjacent to one end thereof, and means for illuminating the signalling member.

7. In a signalling device of the class described, in combination, a support and attaching member comprising a supporting body to be carried upon a load in a truck or other vehicle and having attaching means for securing it to such load, an axis member carried by said supporting body, a signalling member mounted to turn in a plane transverse to the axis of said supporting body and connected with said axis member, and a connection between said axis member and said signalling member comprising a pivot disposed substantially at right angles to the axis member whereby the signalling member may have rotative movement with the axis member as an axis and may have pivotal movement away from the axis member with said pivot connection as a separate axis.

JOHN E. MACKAY.